United States Patent Office 2,860,012
Patented Nov. 11, 1958

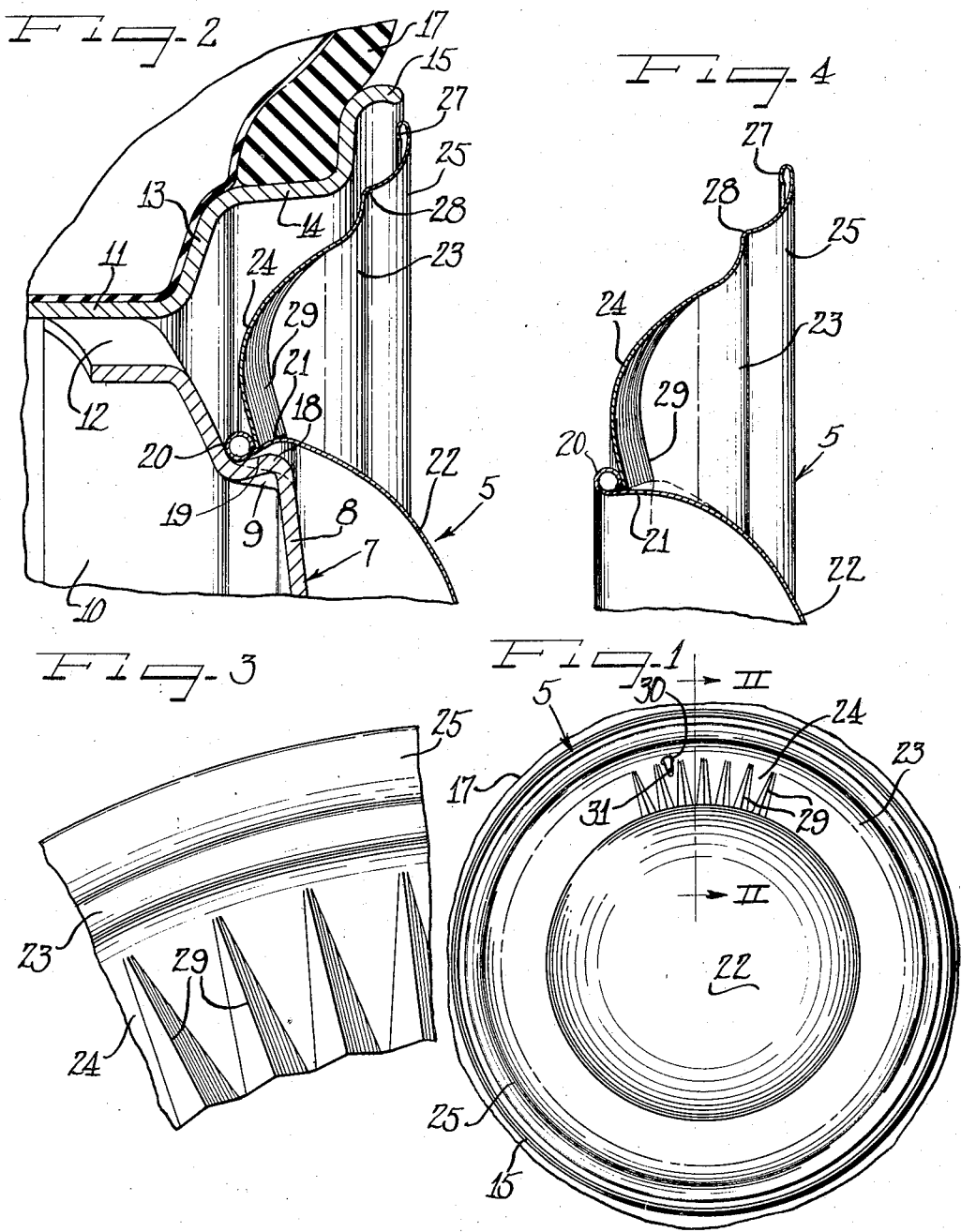

2,860,012

WHEEL COVER

George Albert Lyon, Detroit, Mich.

Application October 7, 1954, Serial No. 460,885

3 Claims. (Cl. 301—37)

The present invention relates to improvements in wheel structures and more particularly concerns the ornamental and protective covering of the outer sides of the vehicle wheels.

An important object of the present invention is to provide a wheel structure having a novel wheel covering therefor.

Another object of the invention is to provide in a wheel structure an improved wheel cover assembly adapted for snap-on pry-off cooperation with bumps on a vehicle wheel.

A further object of the invention is to provide an improved two-part wheel cover.

Still another object of the invention is to provide an improved method of making a composite wheel cover.

Other objects, features and advantages of the present invention will be readily apparent from the following detailed description of a preferred embodiment thereof taken in conjunction with the accompanying drawing, in which:

Figure 1 is an outer side elevational view of a vehicle wheel structure embodying features of the invention.

Figure 2 is an enlarged fragmentary radial sectional view taken substantially on the line II—II of Figure 1.

Figure 3 is a fragmentary outer side elevational view of the ring component of the cover of the present invention; and Figure 4 is a fragmentary radial sectional view through the cover, similar to Figure 2 but showing the cover components in a preliminary stage of assembly.

According to the present invention a wheel cover assembly 5 is provided which is adapted to be applied to the outer side of a vehicle wheel embodying features covered in my issued Patent 2,445,330, dated July 20, 1948. To this end the wheel includes a wheel body 7 of the disk spider type having an annular nose bulge 8 provided with a generally radially outwardly facing annular shoulder 9 spaced radially inwardly from the outer periphery of the wheel body which is defined by an attachment flange 10 secured in suitable fashion to a base flange 11 of a tire rim, and inset at suitable points to provide the wheel openings 12 through which air may circulate. The tire rim has an outer side flange 13 merging with an intermediate generally radially inwardly facing flange 14 from which extends a radially outwardly and then axially outwardly directed terminal flange 15. The multi-flange arrangement of the tire rim adapts the same to support a pneumatic tire and tube assembly 17 or, alternatively, a tubeless tire.

For retaining the cover 5 in position on the wheel, the shoulder 9 of the wheel body is provided at suitable intervals such as three equally spaced intervals with generally radially outwardly projecting cover retaining bumps 18 provided with generally radially and axially inwardly sloping respective cover retaining shoulders 19 which are offset radially outwardly from the adjacent face of the shoulder 9. Through this arrangement, a resiliently flexible annular turned bead 20 on a radially flexible generally radially and axially inwardly directed oblique marginal flange 21 of a central hub cap component or cover portion 22 of the cover assembly 5 is adapted to engage in snap-on pry-off relation with the retaining bumps 18.

It will be observed that the bead 20 in this instance is turned outwardly, that is generally radially and axially outwardly and that the inside diameter described by the bead is slightly less than the minimum or smallest diameter described by the bump shoulder faces 19 so that the bead 20 will maintain a resilient tensioned grip upon the bumps 18 tending to draw the cover assembly axially inwardly and maintain the same in such position on the wheel.

In addition to the hub cap portion 22, the cover 5 includes a ring member or portion 23 which is of a diameter to extend from the marginal flange 21 of the hub cap component of the cover generally radially and axially outwardly into overlying relation to the tire rim. To this end, the ring component 23 of the cover has an inner generally dished annular portion 24 with its inner edge in assembled relation about the hub cap marginal flange 21 and maintained by the supported inter-engagement with the hub cap in substantial axially outwardly spaced relation to the adjacent radially outer portion of the wheel body 7 and the tire rim side flange 13. At its radially outer margin, the ring component 23 has a generally rib-like annular axially outwardly convex terminal portion 25 having the outer extremity thereof underturned to provide a reinforcing and finishing flange 27. The marginal portion 25 preferably joins the generally axially and radially outwardly directed margin of the dished annular inner portion 24 of the ring on a rigidifying annular axially inwardly indented reenforcing rib 28 of a diameter to overlie in assembly in air gap spaced relation the juncture shoulder between the intermediate flange 14 and the terminal flange 15. It will also be observed that the underturned extremity flange 27 affords an edge extremity for the ring component 23 which is spaced from the terminal flange 15, thus enabling air to circulate through the gap between the tire rim and the cover and through the wheel openings 12.

In order to afford a firm, stable interengagement of the inner edge of the ring member 23 with the hub cap component marginal flange 21, the edge is preferably provided with a generally corrugated, or serpentine, zig-zag, or undulating form whereby to substantially increase the extent of contact with the flange 21 in the generally axial direction. Herein this is accomplished in a convenient, pleasingly ornamental manner by providing the dished inner portion 24 of the ring component with a spaced annular series of generally radially extending ribs 29 of preferably radially outwardly diminishing tapering form and radially inwardly flaring form terminating at their radially inner ends in the inner edge of the ring member and merging at their radially outer ends into the radially outer side of the dished portion 24 of the cover member. As will be observed in Figure 2, the inner ends of the ribs 29 and the contiguous inner extremity marginal portion of the dished ring portion 24 is directed generally radially inwardly and axially outwardly at a substantial oblique angle to the axis of the cover and substantially normal to the oblique hub cap marginal flange 21. Thereby, not only is the inner edge portion of the ring member 23 effectively interlockingly engaged with the margin of the hub cap member 22 between the bead 20 and the overhanging shoulder afforded by the flange 21, but adequate resilient yieldability of the inner edge portion of the ring member 23 is assured for deflection responsive to and with the bead 20 and the flange 21 in the camming onto and off of the retaining bumps 18 in the application or removal of the cover relative to the wheel.

In applying the cover 5 to the outer side of the wheel, the cover is generally centered with respect to the wheel and with a valve stem aperture 30 in the cover portion 23 between a pair of the ribs 29 in register with a valve stem 31. Then, axially inward pressure applied against the hub cap control portion 22 of the cover will cause the beaded margin of the hub cap portion to snap into retaining interengagement with the retaining bumps 18. Pry-off of the cover is facilitated by the rigid outer marginal structure of the ring component 23 of the cover wherein not only the underturned bead flange 27 but also the inwardly spaced rib 28 provides for application of pry-off force, and then if still necessary, as pry-off continues, the pry-off tool such as a screw driver can be inserted through the groove afforded at the inner side of the ribs 29 into engagement with the bead 20 for completing the pry-off leverage.

In the manufacture of the cover 5, the hub cap component 22 may conveniently be made from suitable sheet material, such as stainless steel or brass, or the like by a stamping or drawing process but in the initial form of the hub cap component, as best seen in Figure 4, the outer marginal flange portion 21 extends generally axially inwardly and may slope radially inwardly with respect to the bead 20.

The ring component 23 of the cover may be stamped or drawn to shape from suitable sheet material such as stainless steel or brass, or it may be made as a rolled section from strip stock and welded together to form a continuous solid ring member fully formed to its final shape.

Assembly of the cover components 22 and 23 is effected by relative axial assembly movement to bring the inner margin of the ring component 23 into assembly against the bead 20. Then the marginal flange 21 of the hub cap component is forced uniformly radially outwardly as by press or spinning operation into retaining, overlying, interlocking relation with the ends of the ribs 29, substantially as indicated in dash outline in Figure 4. The cover will then have the assembled appearance as shown in Figure 2. Thereby the cover components 22 and 23 will intimately and permanently cooperatively lock together in assembly and provide the unitary cover construction 5.

It will be understood that modifications and variations may be effected without departing from the scope of the novel concepts of the present invention.

I claim as my invention:

1. In a wheel structure including a tire rim and a disk-spider wheel body having an annular intermediate nose bulge provided at the radially outer side thereof with generally radially outwardly projecting cover retaining bumps affording generally axially inwardly and radially outwardly directed shoulders, a cover for disposition at the outer side of the wheel including a central hub cap cover member with a side wall provided with a resilient turned terminal edge structure engageable resiliently in press-on, pry-off relation with said bump shoulders, said hub cap side wall including a portion adjacent to said terminal structure facing generally axially inwardly and radially outwardly, and an annular cover member for substantially overlying the tire rim and the portion of the wheel body intervening between said bumps and the tire rim, said annular cover member having an axially inwardly dished radially inner portion directed radially inwardly and axially outwardly toward and being in thrusting engagement with said hub cap side wall portion, said annular cover member being of substantially rigid construction and being engageable by a pry-off tool levered against the tire rim for exertion of pry-off force against the annular cover member transmitted by said thrusting dished inner portion of the annular cover member to said hub cap side wall portion for exertion of pry-off force to dislodge said turned retaining terminal structure from the retaining bumps, said dished inner portion of the annular cover member having transversely thereacross reinforcing ribs which shoulder at their ends against said hub cap side wall portion for enhancing the pry-off thrust of said dished portion.

2. In a wheel structure including a tire rim and a disk-spider wheel body having an annular intermediate nose bulge provided at the radially outer side thereof with generally radially outwardly projecting cover retaining bumps affording generally axially inwardly and radially outwardly directed shoulders, a cover for disposition at the outer side of the wheel including a central hub cap cover member with a side wall provided with a resilient turned terminal edge structure engageable resiliently in press-on, pry-off relation with said bump shoulders, said hub cap side wall including a portion adjacent to said terminal structure facing generally axially inwardly and radially outwardly, and an annular cover member for substantially overlying the tire rim and the portion of the wheel body intervening between said bumps and the tire rim, said annular cover member having an axially inwardly dished radially inner portion directed radially inwardly and axially outwardly toward and being in thrusting engagement with said hub cap side wall portion, said annular cover member being of substantially rigid construction and being engageable by a pry-off tool levered against the tire rim for exertion of pry-off force against the annular cover member transmitted by said thrusting dished inner portion of the annular cover member to said hub cap side wall portion for exertion of pry-off force to dislodge said turned retaining terminal structure from the retaining bumps, said annular cover member having in the radially outer portion thereof a plurality of annular reinforcing ribs one of which is disposed radially inwardly from the radially outer edge of the annular cover member and is directed generally axially inwardly for providing a pry-off rib engageable by a pry-off tool in effecting the pry-off leverage aforesaid.

3. In a wheel structure including a tire rim and a central body portion having thereon cover retaining means, a cover assembly for disposition over the outer side of the wheel including a central cover member having terminal means engageable with said retaining means on the wheel body and providing a generally axially inwardly and radially outwardly facing shoulder structure adjacent to the retaining means, and a radially outer annular cover member for overlying the tire rim and having an annular radially inner portion dished generally axially inwardly for stiffness and having the inner margin thereof disposed generally radially inwardly and axially outwardly and thrustingly engaging said shoulder, said inwardly dished portion having a generally radially extending rib therein providing a generally axially inwardly opening channel affording a passageway for a pry-off tool inserted from the radially outer side of said annular cover member therebehind and toward said cover retaining means for prying the cover from the wheel.

References Cited in the file of this patent

UNITED STATES PATENTS

| | | |
|---|---|---|
| 2,148,212 | Lyon | Feb. 21, 1939 |
| 2,190,669 | Lyon | Feb. 20, 1940 |
| 2,306,631 | Lyon | Dec. 29, 1942 |
| 2,368,229 | Lyon | Jan. 30, 1945 |
| 2,448,537 | Lyon | Sept. 7, 1948 |
| 2,458,490 | Lyon | Jan. 4, 1949 |
| 2,497,895 | Lyon | Feb. 21, 1950 |
| 2,544,701 | Lyon | Mar. 13, 1951 |
| 2,639,948 | Grimshaw | May 26, 1953 |

FOREIGN PATENTS

| | | |
|---|---|---|
| 494,765 | Canada | July 28, 1953 |